(12) United States Patent
Mihalos et al.

(10) Patent No.: US 11,197,481 B2
(45) Date of Patent: Dec. 14, 2021

(54) BISCUIT WITH DEBOSSING ON TOP AND BOTTOM

(71) Applicant: Intercontinental Great Brands, LLC, East Hanover, NJ (US)

(72) Inventors: Mihaelos N. Mihalos, Palisades Park, NJ (US); Theodore N. Janulis, Randolph, NJ (US); Alan John Kino, Waldwick, NJ (US); Kenchu Antonio Tham, Sparta, NJ (US)

(73) Assignee: INTERCONTINENTAL GREAT BRANDS, East Hanover, NJ (US)

( * ) Notice: Subject to any disclaimer, the term of this patent is extended or adjusted under 35 U.S.C. 154(b) by 837 days.

(21) Appl. No.: 14/651,365

(22) PCT Filed: Dec. 12, 2013

(86) PCT No.: PCT/US2013/074565
§ 371 (c)(1),
(2) Date: Jun. 11, 2015

(87) PCT Pub. No.: WO2014/093576
PCT Pub. Date: Jun. 19, 2014

(65) Prior Publication Data
US 2015/0305350 A1 Oct. 29, 2015

Related U.S. Application Data

(60) Provisional application No. 61/737,337, filed on Dec. 14, 2012.

(51) Int. Cl.
*A21C 14/00* (2006.01)
*A23P 20/20* (2016.01)
(Continued)

(52) U.S. Cl.
CPC .............. *A21C 14/00* (2013.01); *A21D 13/32* (2017.01); *A21D 13/47* (2017.01); *A21D 13/80* (2017.01); *A23P 20/20* (2016.08); *A23P 30/10* (2016.08)

(58) Field of Classification Search
CPC .......... A21C 14/00; A23P 20/20; A23P 30/20; A21D 13/80; A21D 13/17
See application file for complete search history.

(56) References Cited

U.S. PATENT DOCUMENTS 1,950,734 A 3/1934 Leaf
3,590,748 A 7/1971 Palmer
(Continued)

FOREIGN PATENT DOCUMENTS

EP 0862862 A1 9/1998
GB 2317322 B 3/1998
(Continued)

OTHER PUBLICATIONS

Olga, Trubochki-Cream Filled Pizzelles (https://www.olgasflavorfactory.com/recipes/russianrecipes/trubochki-cream-filled-pizzelles/) (Year: 2012).*

(Continued)

*Primary Examiner* — Erik Kashnikow
*Assistant Examiner* — Lela S. Williams
(74) *Attorney, Agent, or Firm* — Morgan, Lewis & Bockius LLP

(57) ABSTRACT

A foodstuff, and a method and system of making the same, comprises a biscuit having a generally planar top surface and a generally planar bottom surface. The biscuit includes first indicia on the top surface that has a plurality of projections that extend from the top surface. The biscuit also includes second indicia on the bottom surface that has an imprint recessed from the bottom surface.

16 Claims, 6 Drawing Sheets

(51) Int. Cl.
- *A23P 30/10* (2016.01)
- *A21D 13/32* (2017.01)
- *A21D 13/47* (2017.01)
- *A21D 13/80* (2017.01)

(56) References Cited

U.S. PATENT DOCUMENTS

| | | | |
|---|---|---|---|
| 4,517,209 | A | 5/1985 | Thornton et al. |
| 4,621,997 | A | 11/1986 | Cavanagh, Jr. et al. |
| 5,297,947 | A | 3/1994 | Cardinali |
| D374,541 | S | 10/1996 | Garza |
| 6,257,127 | B1 | 7/2001 | Lin |
| 2001/0024670 | A1 | 9/2001 | Gehan et al. |
| 2001/0043969 | A1 | 11/2001 | Wild |
| 2004/0151807 | A1 | 8/2004 | Damsgard |
| 2006/0013922 | A1 | 1/2006 | Chandaria |
| 2008/0003340 | A1 | 1/2008 | Karwowski et al. |

FOREIGN PATENT DOCUMENTS

| | | | | |
|---|---|---|---|---|
| JP | H06276921 A | 10/1994 | | |
| WO | WO-2012120154 A2 * | 9/2012 | ............ | A21D 13/02 |
| WO | 2014093576 | 6/2014 | | |

OTHER PUBLICATIONS

Manely, The Biscuit Doctor (http://www.thebiscuitdoctor.com/manufacturing-processes/83-resources/processes-wafers/187-baking) (Year: 2013).*
Courtney, Pizzelle Nutella S'mores (https://pizzazzerie.com/recipes/desserts/recipe-pizzelle-nutella-smores/) (Year: 2012).*
Melanie's Kitchen, Double-Lemon &Vanilla Kissed Pizzelle Cookies (https://www.bitchinfrommelanieskitchen.com/2011/12/-double-lemon-hint-of-vanilla-pizzelle-cookies-.html). (Year: 2011).*
Gooch, Pizzelles Bring Tuscan Elegance to the Cookie Tray (https://www.chicagotribune.com/news/ct-xpm-2000-12-13-0012130013-story.html). (Year: 2000).*
Notification of the First Office Action dated Aug. 18, 2016 for Chinese Patent Application No. 201380063830.2.
European Search Report and Opinion for European patent application EP 13862492 dated Jun. 28, 2016, 9 pages.
The International Preliminary Report on Patentability for International Application PCT/US2013/074565, dated Jun. 16, 2015, 6 pages.
The International Search Report for International Application PCT/US2013/074565, dated Apr. 23, 2014, 3 pages.
The Written Opinion for International Application PCT/US2013/074565, dated Apr. 23, 2014, 5 pages.
Examination Report dated May 31, 2017 for European Patent Application No. 13862492.9.
Requisition by the Examiner dated May 26, 2016 for Canadian Patent Application No. 2,888,848.
hltps://web.archive.org/web/20120819231345/http://www.taquitos.net/cookies/Forrelli-NiceCookles, Aug. 19, 2012.
Canadian Patent Application No. 2,888,848 Office Action, dated Feb. 7, 2017, 4 pages.
Canadian Patent Application No. 2,888,848 Office Action, dated Nov. 3, 2017, 4 pages.
Chinese Patent Application No. 201380063830.2 Notification of Second Office Action, dated May 3, 2017, 9 pages.
Chinese Patent Application No. 201380063830.2 Notification of Third Office Action, dated Dec. 18, 2017, 10 pages.
Canadian Patent Application No. 2,888,848 Office Action, dated May 26, 2016, 5 pages.
Chinese Patent Application No. 201380063830.2 Notification of First Office Action, dated Aug. 18, 2016, 11 pages.
International Search Report dated Jun. 16, 2015 for International Patent Application No. PCT/US2013/074565, 6 pages.
International Preliminary Report on Patentability dated Apr. 23, 2014 for International Patent Application No. PCT/US2013/074565, 3 pages.
European Search Report dated Jun. 28, 2016 for European Patent Application No. 13862492.9, 9 pages.
Nice Cookies, http://www.taquitos.net/cookies/Forrelli-Nice-Cookies, downloaded Sep. 8, 2016, 4 pages.
Canadian Notice of Allowance for CA Patent Application No. 2,888,848; dated Dec. 16, 2019; 3 pages.
Canadian Requisition for Application No. 2,888,848; dated Jul. 27, 2018; 3 pages.
Chinese Decision of Rejection for Application No. 201380063830.2 (with English translation); dated Jul. 10, 2018; 9 pages.
Chinese Office Action for CN 201380063830.2; dated Sep. 10, 2020; 16 pages.
Technology of biscuits, crackers and cookies (Third Edition), Manley Duncan, China Light Industry Press, the 1st Edition in Apr. 2006, p. 338, Apr. 30, 2006.
Modern Agriculture and Food Processing, JING Baoqing, Guangxi People s Publishing House, the 1st Edition in Jan. 2010, p. 100, Jan. 31, 2010.
Food processing technology and recipe collection (Second Volume), Changsha Food Research Institute, p. 309, Jul. 31, 1988.
U.S. Office Action for U.S. Appl. No. 16/809,055; dated Nov. 16, 2020; 10 pages.

* cited by examiner though, that the invention is not limited to the

BISCUIT WITH DEBOSSING ON TOP AND BOTTOM

CROSS-REFERENCE TO RELATED APPLICATIONS

This application is a U.S. National Stage Entry of International Patent Application No. PCT/US2013/074565, filed Dec. 12, 2013, which in turn claims the benefit of U.S. Provisional Patent Application No. 61/737,337 filed Dec. 14, 2012 entitled "Biscuit With Debossing On Top And Bottom", which are incorporated by reference herein in its their entirety.

BACKGROUND OF THE INVENTION

The present invention generally relates to biscuits with debossing on top and bottom and methods of making the same.

BRIEF SUMMARY OF THE INVENTION

In one embodiment there is a foodstuff comprising: a biscuit having a generally planar top surface and a generally planar bottom surface; first indicia on the top surface including a plurality of projections extending from the top surface; and second indicia on the bottom surface including an imprint recessed from the bottom surface. In one embodiment, the imprint includes a sidewall that is at an oblique angle with respect to the bottom surface. In one embodiment, the oblique angle is less than approximately 65 degrees. In one embodiment, the imprint is recessed a distance from the bottom surface that is approximately 60% of a thickness of the biscuit. In one embodiment, the imprint is recessed a distance from the bottom surface that is approximately 40% of a thickness of the biscuit.

In one embodiment, the imprint is recessed a distance from the bottom surface that is approximately 20% to approximately 60% of a thickness of the biscuit. In one embodiment, the imprint is filled with an edible filling and the indicia lies on a plane generally co-planar with the bottom surface. In one embodiment, the second indicia includes one or more words. In one embodiment, the second indicia includes one or more images. In one embodiment, the second indicia is a negative of the one or more images such that the one or more images projects from the biscuit. In one embodiment, at least some of the plurality of projections have a thickness in a direction generally parallel to the top surface of less than approximately 0.04 inches.

In one embodiment, the plurality of projections extend approximately 0.115 inches from the top surface. In one embodiment, the biscuit is approximately 0.2 inches thick. In one embodiment, the biscuit is approximately 0.1 inches to approximately 0.3 inches thick. In one embodiment, a density of the biscuit between the imprint and the top surface is greater than a density of the biscuit between the bottom surface and the top surface with no imprint. In one embodiment, the biscuit is rotary molded.

In another embodiment, there is a sandwich foodstuff comprising: a first biscuit having a generally planar first top surface and a generally planar first bottom surface, a plurality of first projections extending from the first top surface; a second biscuit having a generally planar second top surface and a generally planar second bottom surface, a plurality of second projections extending from the second top surface; and a filling sandwiched between the first bottom surface and the second bottom surface, wherein one or both of the first bottom surface and the second bottom surface include indicia.

In another embodiment, there is a method for making biscuits, comprising: adding dough to a rotary mold to form a biscuit having a top surface and a bottom surface; debossing the top surface of the biscuit with the rotary mold; and debossing the bottom surface. In one embodiment, debossing the bottom surface includes passing the biscuit through first and second rollers, the first roller being compliant and configured to contact and protect the top surface of the biscuit, the second roller being opposed from the first roller and configured to deboss indicia into the bottom surface of the biscuit.

In another embodiment, there is a system for making biscuits comprising: a mold configured to mold a plurality of molded biscuits each having a first generally planar top surface and a generally planar bottom surface, the top surface including a plurality of projections; a first roller configured to contact the top surface of each molded biscuit and protect the plurality of projections; a second roller opposed from the first roller and configured to deboss indicia into the bottom surface of each molded biscuit. In one embodiment, the first roller is comprised of a compliant material. In one embodiment, the first roller is comprised of rubber. In one embodiment, the second roller is comprised of metal. In one embodiment, the second roller is comprised of polymeric material. In one embodiment, the second roller includes a surface release coating. In one embodiment, the mold includes a rotary mold. In one embodiment, the second roller includes a plurality of detachable sections. In a further embodiment, the system includes a belt configured to extract the molded biscuits from the mold and transfer the molded biscuits towards the first and second rollers.

BRIEF DESCRIPTION OF THE SEVERAL VIEWS OF THE DRAWINGS

The foregoing summary, as well as the following detailed description of embodiments of the biscuits with debossing on top and bottom and methods of making the same, will be better understood when read in conjunction with the appended drawings of exemplary embodiments. It should be understood, however, that the invention is not limited to the precise arrangements and instrumentalities shown.

In the drawings.

DETAILED DESCRIPTION OF THE INVENTION

Figure 1:
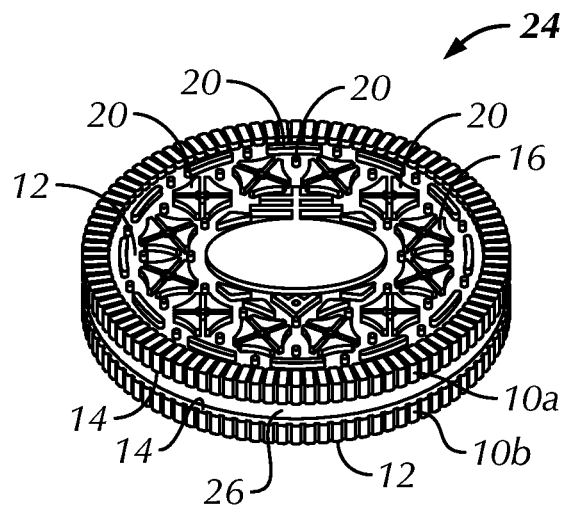
FIG. 1 is a perspective view of a cookie sandwich having first and second biscuits with debossing on top and/or bottom in accordance with an exemplary embodiment of the present invention.

Biscuits, or cookies, are edible foodstuffs that are formed from a dough. The dough, in some embodiments, includes a mixture of sugar, fat and/or oil and water. The dough is often formed into a specific shape prior to baking. In biscuits with a relatively low post-bake moisture content (e.g., having a post-bake moisture content of less than approximately 5%), the shape of the dough before baking is substantially retained in the biscuit post-bake (e.g., spreading during baking is minimal). A dough with limited spreading during baking allows for the dough to be molded into intricate designs prior to baking. Such commercial biscuits are typically formed by rotary molding. Rotary molded biscuits are typically formed by packing the dough into the mold, using a blade to further pack the dough into the mold and scrape away the excess dough from the mold, and then extracting the molded biscuit out of the mold and onto a belt for transferring to an oven. Rotary molded biscuits typically have a molded or debossed top surface and a generally planar bottom surface. Examples of rotary molded biscuit include the biscuits used in Oreo® cookie sandwiches, the biscuits used in Nutter Butter® cookie sandwiches, the biscuits used in Cameo® cookie sandwiches and Belvita® breakfast biscuits.

With reference to FIGS. 1-5 and 11, an embodiment of the present invention is a sandwich cookie that includes two or more opposed biscuits with a soft filling between the biscuits. A popular way for consumers to enjoy sandwich cookies is to peel away or twist off one of the biscuits from the other biscuit, consume one of the biscuits separately, or consume the filling separately by licking the filling off one or both biscuits. This is particularly enjoyable for sandwich cookies with hard (e.g., low moisture content) cookies because the biscuit integrity is more likely to stay intact when it is separated from the sandwich. In one embodiment of the present invention, consumers can find new and surprising ways to enjoy sandwich cookies by revealing surprising messages when a biscuit is separated from the sandwich. The sandwich may be configured such that the message is immediately revealed upon separation of the biscuit. The sandwich may also be configured such that the message is revealed when filling is licked away from the biscuit. In one example, the filling and the biscuit contain contrasting colors, textures or other properties that enhance the visual appearance of the message. The message may be in the form of words, symbols, illustrations, images and the like.

In one embodiment, at least part of the message is debossed in a biscuit. In a debossed embodiment, the message may be indented into the bottom surface of the biscuit. The indenting may create a visual contrast by itself such that the message is deliverable merely through the debossing. In other embodiments, the filling interacts with the debossed message to enhance the message. For example, a white filling may fill in, partially or completely, a message debossed in a dark colored (e.g., contrasting) cookie. A negative of an object may be debossed in the biscuit such that the object projects from the biscuit. For example, if the object is a soccer ball, the panels and the area surrounding the soccer ball may be debossed in the biscuit such that the lines of the soccer ball are left extending from the biscuit. In still other embodiments, the message may be printed on the biscuit. In a printed embodiment, the message may be revealed upon the peeling of a biscuit or the sandwich may be configured such that the message is revealed when filling is licked or otherwise scraped from the biscuit. Embodiments such as these result in an added consumer enjoyment to the snack and can convey a desirable promotional message.

In some instances, challenges may be posed when one undertakes to deboss a biscuit. Debossing, in some embodiments, involves pressing a tool into formed or partially formed biscuits. The pressure applied to the biscuit in order for the biscuit to have a sufficiently debossed biscuit may risk damaging the biscuit. For example, too much pressure may result in a defective biscuit. Such damage may occur when the biscuit is debossed, prior to baking, during baking, after baking, during packaging, during shipment or during other further processing steps. Controlling the integrity of the biscuit can be especially significant in high volume production embodiments where defects are not easily attended to. Pressure that is too light may result in a biscuit not being sufficiently debossed so as to real the message in a desirable way (e.g., the message may not be visible).

Applying sufficient pressure to the debossing tool may also risk impairment to features that are intended to be retained on the side of the biscuit opposite the debossed message. In some embodiments, molded features are integral with the biscuit and are formed by rotary molding the features into one side of the biscuit. The rotary molded features on one side of a biscuit, in some embodiments, must be protected when debossing the opposite side of the biscuit. Otherwise, pressures applied to the rotary molded side of the biscuit that are sufficient to create a desirable message affect on the debossed side of the biscuit may cause damage or all or part of the rotary molded feature. In one embodiment, a rotary molded biscuit exhibits a well defined molded pattern on one side of a low moisture content biscuit and a well defined debossed message on the opposite side of the biscuit.

Referring to the drawings in detail, wherein like reference numerals indicate like elements throughout, there are shown in FIGS. 1-5 biscuits, generally designated 10, in accordance with exemplary embodiments of the present invention.

Referring to FIGS. 2A-2D, in one embodiment, biscuit 10 includes a debossed top surface 12 and a debossed bottom surface 14. In one embodiment, biscuit 10 includes first indicia 16 on top surface 12 and second indicia 18 on bottom surface 14. In some embodiments, debossing both the top surface 12 and bottom surface 14 of a biscuit 10 rather than only debossing top surface 12 allows for a more aesthetic biscuit 10, utilize additional indicia space that would have otherwise been left blank, include indicia that compliments, repeats or differs from the indicia on the opposing side, and/or biscuit 10 that can be presented with either top surface 12 or bottom surface 14 facing the consumer. Also, as described in further detail below, in some embodiments, using one or more biscuits 10 in a sandwich cookie configuration (see FIG. 1), allows for an interior facing message or second indicia 18 to be discovered by the consumer during consumption.

In one embodiment, biscuit 10 is capable of being molded. In one embodiment, biscuit 10 is a dry biscuit. In one embodiment, biscuit 10 has a post-bake moisture content of less than approximately 4.5%. In one embodiment, biscuit 10 has a post-bake moisture content of less than approximately 4.3%. In one embodiment, biscuit 10 has a post-bake moisture content of less than approximately 4.1%. In one embodiment, biscuit 10 has a post-bake moisture content of less than approximately 3.9%. In one embodiment, biscuit 10 has a post-bake moisture content of less than approximately 3.7%. In one embodiment, biscuit 10 has a post-bake moisture content of less than approximately 3.5%. In one embodiment, biscuit 10 has a post-bake moisture content of less than approximately 3.3%. In one embodiment, biscuit 10 has a post-bake moisture content of less than approximately 3.1%. In one embodiment, biscuit 10 has a post-bake moisture content of less than approximately 2.9%. In one embodiment, biscuit 10 has a post-bake moisture content of less than approximately 2.7%. In one embodiment, biscuit 10 has a post-bake moisture content of less than approximately 2.5%. In one embodiment, biscuit 10 has a post-bake moisture content of less than approximately 2.3%. In one embodiment, biscuit 10 has a post-bake moisture content of less than approximately 2.1%. In one embodiment, biscuit 10 has a post-bake moisture content of less than approximately 2.0%. In one embodiment, biscuit 10 has a post-bake moisture content of less than approximately 1.9%. In one embodiment, biscuit 10 has a post-bake moisture content of less than approximately 1.7%. In one embodiment, biscuit 10 has a post-bake moisture content of less than approximately 1.5%. In one embodiment, biscuit 10 has a post-bake moisture content of less than approximately 1.3%. In one embodiment, biscuit 10 has a post-bake moisture content of less than approximately 1.1%. In one embodiment, biscuit 10 has a post-bake moisture content of less than approximately 0.9%.

Figure 2A:
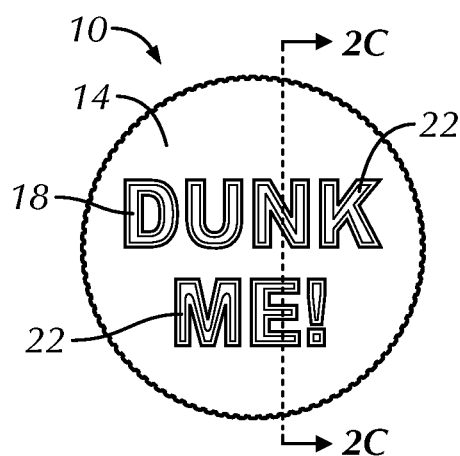
FIG. 2A is a bottom view of the first biscuit shown in FIG. 1.
Figure 2B:
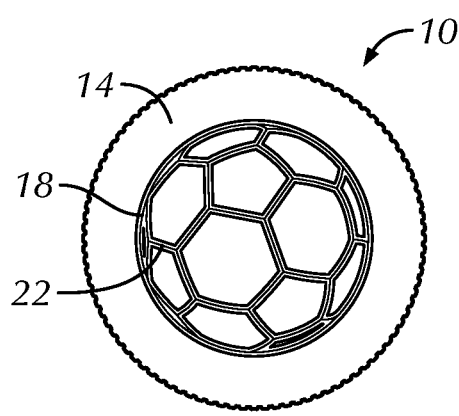
FIG. 2B is a bottom view of the second biscuit shown in FIG. 1.
Figure 2C:
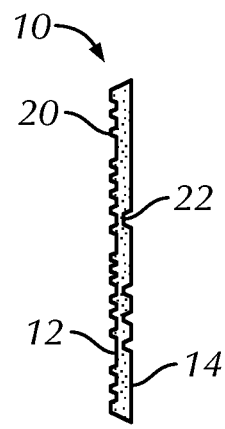
FIG. 2C is a cross sectional side view of the first biscuit of FIG. 2A taken along line 2C.
Figure 2D:
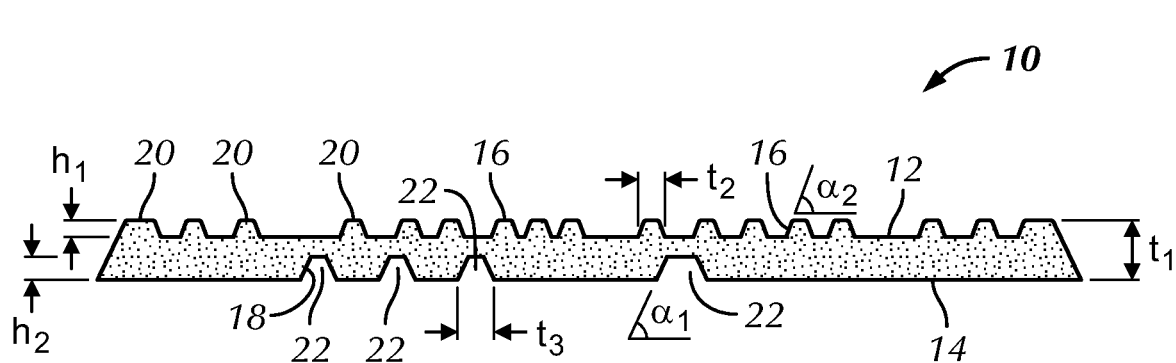
FIG. 2D is an enlarged and rotated view of FIG. 2C.

Referring to FIGS. 1-2D, in one embodiment, top surface 12 and bottom surface 14 are generally planar. In one embodiment, biscuit 10 is circular. In other embodiments, top surface 12 and bottom surface 14 have any contour including stepped, convex and or concave and biscuit 10 may be any shape including oval, rectangular or triangular.

In one embodiment, biscuit 10 has a diameter of approximately 1.8 inches and a thickness $t_1$ (see FIG. 2D) of approximately 0.2 inches. In one embodiment, biscuit 10 has a thickness $t_1$ of approximately 0.10 inches to approximately 0.3 inches. In one embodiment, biscuit 10 has a thickness $t_1$ of approximately 0.40 inches. In one embodiment, biscuit 10 has a thickness $t_1$ of approximately 0.38 inches. In one embodiment, biscuit 10 has a thickness $t_1$ of approximately 0.36 inches. In one embodiment, biscuit 10 has a thickness $t_1$ of approximately 0.34 inches. In one embodiment, biscuit 10 has a thickness $t_1$ of approximately 0.32 inches. In one embodiment, biscuit 10 has a thickness $t_1$ of approximately 0.30 inches. In one embodiment, biscuit 10 has a thickness $t_1$ of approximately 0.28 inches. In one embodiment, biscuit 10 has a thickness $t_1$ of approximately 0.26 inches. In one embodiment, biscuit 10 has a thickness $t_1$ of approximately 0.24 inches. In one embodiment, biscuit 10 has a thickness $t_1$ of approximately 0.22 inches. In one embodiment, biscuit 10 has a thickness $t_1$ of approximately 0.20 inches. In one embodiment, biscuit 10 has a thickness $t_1$ of approximately 0.18 inches. In one embodiment, biscuit 10 has a thickness $t_1$ of approximately 0.16 inches. In one embodiment, biscuit 10 has a thickness $t_1$ of approximately 0.14 inches. In one embodiment, biscuit 10 has a thickness $t_1$ of approximately 0.12 inches. In one embodiment, biscuit 10 has a thickness $t_1$ of approximately 0.10 inches.

In one embodiment, the maximum width of biscuit 10 is at least approximately 4 times thickness $t_1$. In one embodiment, the maximum width of biscuit 10 is at least approximately 5 times thickness $t_1$. In one embodiment, the maximum width of biscuit 10 is at least approximately 6 times thickness $t_1$. In one embodiment, the maximum width of biscuit 10 is at least approximately 7 times thickness $t_1$. In one embodiment, the maximum width of biscuit 10 is at least approximately 8 times thickness $t_1$. In one embodiment, the maximum width of biscuit 10 is at least approximately 9 times thickness $t_1$. In one embodiment, the maximum width of biscuit 10 is at least approximately 10 times thickness $t_1$.

In one embodiment, first indicia 16 on top surface 12 includes a plurality of projections 20 extending from top surface 12. In one embodiment, projections 20 include or form one or more designs, images and/or words. In one embodiment, at least some of projections 20 extend a height $h_1$ from top surface 12. In one embodiment, at least some of projections 20 have a height $h_1$ measured from top surface 12 of approximately 0.115 inches. In one embodiment, at least some of projections 20 have a height $h_1$ from top surface 12 of approximately 0.4 inches. In one embodiment, at least some of projections 20 have a height $h_1$ from top surface 12 of approximately 0.35 inches. In one embodiment, at least some of projections 20 have a height $h_1$ from top surface 12 of approximately 0.30 inches. In one embodiment, at least some of projections 20 have a height $h_1$ from top surface 12 of approximately 0.25 inches. In one embodiment, at least some of projections 20 have a height $h_1$ from top surface 12 of approximately 0.20 inches. In one embodiment, at least some of projections 20 have a height $h_1$ from top surface 12 of approximately 0.15 inches. In one embodiment, at least some of projections 20 have a height $h_1$ from top surface 12 of approximately 0.10 inches. In one embodiment, at least some of projections 20 have a height $h_1$ from top surface 12 of approximately 0.05 inches.

In one embodiment, at least some of projections 20 have a height $h_1$ that is at least 10% of thickness $t_1$. In one embodiment, at least some of projections 20 have a height $h_1$ that is at least 20% of thickness $t_1$. In one embodiment, at least some of projections 20 have a height $h_1$ that is at least 30% of thickness $t_1$. In one embodiment, at least some of projections 20 have a height $h_1$ that is at least 40% of thickness $t_1$. In one embodiment, at least some of projections 20 have a height $h_1$ that is at least 50% of thickness $t_1$. In one embodiment, at least some of projections 20 have a height $h_1$ that is at least 60% of thickness $t_1$. In one embodiment, at least some of projections 20 have a height $h_1$ that is at least 70% of thickness $t_1$. In one embodiment, at least some of projections 20 have a height $h_1$ that is at least 80% of thickness $t_1$. In one embodiment, at least some of projections 20 have a height $h_1$ that is at least 90% of thickness $t_1$.

In one embodiment, at least some of projections 20 have a thickness $t_2$ in a direction generally parallel to top surface 12 of less than approximately 0.05 inches. In one embodiment, at least some of projections 20 have a thickness $t_2$ in a direction generally parallel to top surface 12 of less than approximately 0.04 inches. In one embodiment, at least some of projections 20 have a thickness $t_2$ in a direction generally parallel to top surface 12 of less than approximately 0.03 inches. In one embodiment, at least some of projections 20 have a thickness $t_2$ in a direction generally parallel to top surface 12 of less than approximately 0.02 inches. In one embodiment, at least some of projections 20 have a thickness $t_2$ in a direction generally parallel to top surface 12 of less than approximately 0.01 inches.

In one embodiment, at least some of projections 20 have a height $h_1$ greater than thickness $t_2$. In one embodiment, at least some of projections 20 have a height $h_1$ greater than 1.1 times the thickness $t_2$. In one embodiment, at least some of projections 20 have a height $h_1$ greater than 1.2 times the thickness $t_2$. In one embodiment, at least some of projections 20 have a height $h_1$ greater than 1.2 times the thickness $t_2$. In one embodiment, at least some of projections 20 have a height $h_1$ greater than 1.3 times the thickness $t_2$. In one embodiment, at least some of projections 20 have a height $h_1$ greater than 1.4 times the thickness $t_2$. In one embodiment, at least some of projections 20 have a height $h_1$ greater than 1.5 times the thickness $t_2$. In one embodiment, at least some of projections 20 have a height $h_1$ greater than 1.6 times the thickness $t_2$. In one embodiment, at least some of projections 20 have a height $h_1$ greater than 1.7 times the thickness $t_2$. In one embodiment, at least some of projections 20 have a height $h_1$ greater than 1.8 times the thickness $t_2$. In one embodiment, at least some of projections 20 have a height $h_1$ greater than 1.9 times the thickness $t_2$. In one embodiment, at least some of projections 20 have a height $h_1$ greater than 2 times the thickness $t_2$.

Referring to FIG. 2D, in one embodiment, at least some of projections 20 include a draft angle $\alpha_2$ measured relative to the top surface 12. In one embodiment, draft angle $\alpha_2$ helps to ensure the dough is released from the mold during molding. In one embodiment, draft angle $\alpha_2$ is at an oblique angle with respect to top surface 12. In one embodiment, draft angle $\alpha_2$ is greater than approximately 55 degrees. In one embodiment, draft angle $\alpha_2$ is greater than approximately 60 degrees. In one embodiment, draft angle $\alpha_2$ is greater than approximately 65 degrees. In one embodiment, draft angle $\alpha_2$ is greater than approximately 75 degrees. In one embodiment, draft angle $\alpha_2$ is greater than approximately 85 degrees. In one embodiment, draft angle $\alpha_2$ is less than 90 degrees.

Referring to FIGS. 2A-2D, in one embodiment, second indicia 18 is provided on bottom surface 14. In one embodiment, second indicia 18 includes one or more words. In one embodiment, second indicia 18 includes one or more phrases (e.g., "Dunk Me!"). In one embodiment, second indicia 18 includes one or more letters. In one embodiment, second indicia 18 includes a phrase such as a fortune. In one embodiment, second indicia 18 includes a clue, a game piece or a translation of a word. In one embodiment, second indicia 18 includes a design or graphic (e.g., a soccer ball, a heart, a logo, or a smiley face). In one embodiment, second indicia 18 includes one or more numbers. In one embodiment, second indicia 18 includes a barcode such as a Quick Response or QR Code that is readable using a smart phone. In one embodiment, second indicia 18 indicates whether the consumer won a prize. In one embodiment, second indicia 18 is related to a packaging theme (e.g., ghosts for Halloween).

In one embodiment, an edible filling 26 is inserted between two opposing biscuits 10 having a contrasting color to filling 26 to form a sandwich. In one embodiment, imprint 22 is configured such that at least a portion of filling 26 is retained in imprint 22 after separating biscuits 10 from one another. In one embodiment, filling 26 retained in imprint 22 results in second indicia 18. In one embodiment, second indicia 18 is revealed after removing a portion of filling 26 from bottom surface 14. In one embodiment, second indicia 18 is revealed after removing all of the filling 26 from bottom surface 14.

In one embodiment, at least some of imprint 22 is recessed into bottom surface 14. In other embodiments, second indicia 18 is printed on bottom surface 14 with an edible substance. In one embodiment, imprint 22 is filled with an edible filling 26 such that second indicia 18 lies on a plane generally co-planar with the bottom surface (see FIG. 5). In one embodiment, filling 26 is retained in imprint 22 after removing a layer of material from biscuit 10. In one embodiment, imprint 22 forms a sharp edge with bottom surface 14 to help separate filling 26 within imprint 22 from the remainder of filling 26 and/or scrape additional filling into imprint 22 when sandwich 24 is separated. In other embodiments, imprint 22 includes one or more projections similar to projections 20.

Referring to FIG. 2D, in one embodiment, at least some of imprint 22 extends into the bottom surface 14 a height $h_2$. In one embodiment, at least some of imprint 22 has a height $h_2$ that is at least approximately 10%-approximately 90% of thickness $t_1$ of biscuit 10. In one embodiment, at least some of imprint 22 has a height $h_2$ that is at least approximately 20%-approximately 60% of thickness $t_1$ of biscuit 10. In one embodiment, at least some of imprint 22 has a height $h_2$ that is at least approximately 10% of thickness $t_1$ of biscuit 10. In one embodiment, at least some of imprint 22 has a height $h_2$ that is at least approximately 20% of thickness $t_1$ of biscuit 10. In one embodiment, at least some of imprint 22 has a height $h_2$ that is at least approximately 30% of thickness $t_1$ of biscuit 10. In one embodiment, at least some of imprint 22 has a height $h_2$ that is at least approximately 40% of thickness $t_1$ of biscuit 10. In one embodiment, at least some of imprint 22 has a height $h_2$ that is at least approximately 50% of thickness $t_1$ of biscuit 10. In one embodiment, at least some of imprint 22 has a height $h_2$ that is at least approximately 60% of thickness $t_1$ of biscuit 10. In one embodiment, at least some of imprint 22 has a height $h_2$ that is at least approximately 70% of thickness $t_1$ of biscuit 10. In one embodiment, at least some of imprint 22 has a height $h_2$ that is at least approximately 80% of thickness $t_1$ of biscuit 10. In one embodiment, at least some of imprint 22 has a height $h_2$ that is at least approximately 90% of thickness $t_1$ of biscuit 10.

In one embodiment, at least some of imprint 22 has a thickness $t_3$ of at least approximately 0.01 inches. In one embodiment, at least some of imprint 22 has a thickness $t_3$ of at least approximately 0.02 inches. In one embodiment, at least some of imprint 22 has a thickness $t_3$ of at least approximately 0.03 inches. In one embodiment, at least some of imprint 22 has a thickness $t_3$ of at least approximately 0.04 inches. In one embodiment, at least some of imprint 22 has a thickness $t_3$ of at least approximately 0.05 inches. In one embodiment, at least some of imprint 22 has a thickness $t_3$ of at least approximately 0.06 inches. In one embodiment, at least some of imprint 22 has a thickness $t_3$ of at least approximately 0.07 inches. In one embodiment, at least some of imprint 22 has a thickness $t_3$ of at least approximately 0.08 inches. In one embodiment, at least some of imprint 22 has a thickness $t_3$ of at least approximately 0.09 inches. In one embodiment, at least some of imprint 22 has a thickness $t_3$ of at least approximately 0.10 inches. In one embodiment, at least some of imprint 22 has a thickness $t_3$ of less than approximately 0.01 inches.

Referring to FIG. 2D, in one embodiment, at least some of imprint 22 includes a draft angle $\alpha_1$ measured from the bottom surface 14. In one embodiment, draft angle $\alpha_1$ helps to ensure the dough is released from the mold during molding. In one embodiment, draft angle $\alpha_1$ is approximately equal to draft angle $\alpha_2$. In one embodiment, draft angle $\alpha_1$ is at an oblique angle with respect to bottom surface 14. In one embodiment, draft angle $\alpha_1$ is greater than approximately 55 degrees. In one embodiment, draft angle $\alpha_1$ is greater than approximately 60 degrees. In one embodiment, draft angle $\alpha_1$ is greater than approximately 65 degrees. In one embodiment, draft angle $\alpha_1$ is greater than approximately 75 degrees. In one embodiment, draft angle $\alpha_1$ is greater than approximately 85 degrees.

In some embodiments, the characteristics of biscuit 10 may determine how biscuit 10 was manufactured. For example, in some embodiments and as discussed in further detail below, imprint 22 may be added after the mold cavity has been at least partially filled to form projections 20. In one embodiment, debossing imprint 22 subsequent to filling the mold results in an increased density of biscuit 10 between imprint 22 and top surface 12. In one embodiment, the density between imprint 22 and top surface 12 is at least 1.1 times greater than the density of biscuit 22 between bottom surface 14 and top surface 12 where there is no imprint 22. In one embodiment, the density between imprint 22 and top surface 12 is at least 1.2 times greater than the density of biscuit 22 between bottom surface 14 and top surface 12 where there is no imprint 22. In one embodiment, the density between imprint 22 and top surface 12 is at least 1.3 times greater than the density of biscuit 22 between bottom surface 14 and top surface 12 where there is no imprint 22. In one embodiment, the density between imprint 22 and top surface 12 is at least 1.4 times greater than the density of biscuit 22 between bottom surface 14 and top surface 12 where there is no imprint 22. In one embodiment, the density between imprint 22 and top surface 12 is at least 1.5 times greater than the density of biscuit 22 between bottom surface 14 and top surface 12 where there is no imprint 22. In one embodiment, the density between imprint 22 and top surface 12 is at least 1.6 times greater than the density of biscuit 22 between bottom surface 14 and top surface 12 where there is no imprint 22. In one embodiment, the density between imprint 22 and top surface 12 is at least 1.7 times greater than the density of biscuit 22 between bottom surface 14 and top surface 12 where there is no imprint 22. In one embodiment, the density between imprint 22 and top surface 12 is at least 1.8 times greater than the density of biscuit 22 between bottom surface 14 and top surface 12 where there is no imprint 22. In one embodiment, the density between imprint 22 and top surface 12 is at least 1.9 times greater than the density of biscuit 22 between bottom surface 14 and top surface 12 where there is no imprint 22. In one embodiment, the density between imprint 22 and top surface 12 is at least 2 times greater than the density of biscuit 22 between bottom surface 14 and top surface 12 where there is no imprint 22.

The density of biscuit 10 may be determined, in one example, by cutting cubed portions of biscuit 10 of known volumes, a first portion including a volume of biscuit 10 between imprint 22 and top surface 12 and a second portion including a volume of biscuit 10 between bottom surface 14 and top surface 12 where there is no imprint 22, weigh the first and second portions and then divide the weight each portion by its respective volume.

Referring to FIG. 1, in one embodiment, two or more biscuits 10 are used to form a sandwich 24. In one embodiment, either one or both of first biscuit 10a and second biscuit 10b includes second indicia 18. In one embodiment, a filling 26 is sandwiched between a first biscuit 10a and a second biscuit 10b. In one embodiment, the bottom surfaces 14 of each biscuit in sandwich 24 face one another. In one embodiment, filling 26 is a cream. In one embodiment, filling 26 is a fruit filling. In one embodiment, filling 26 is a peanut butter filling. In one embodiment, filling 26 is a cheese. In one embodiment, filling 26 at least partially flows into imprint 22 during assembly. In one embodiment, filling 26 cools and hardens after flowing into imprint 22. In one embodiment, filling 26 adheres to imprint 22 after cooling.

Figure 3:
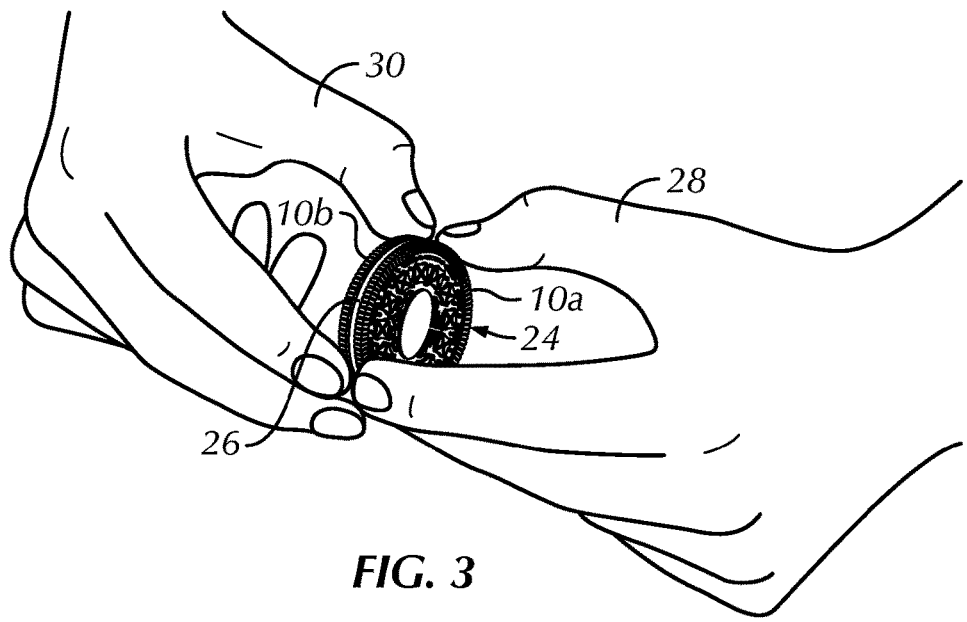
FIG. 3 is a perspective view of the sandwich shown in FIG. 1 being peeled apart by two hands.

Referring to FIG. 3, in one embodiment, sandwich 24 must be separated in order for the consumer to view second indicia 18. In one embodiment, consumer grasps first biscuit 10a with a first hand 28 and grasps second biscuit 10b with a second hand 30. In one embodiment, consumer twists, slides and/or pulls first biscuit 10a relative to second biscuit 10b to separate first biscuit 10a from second biscuit 10b.

Figure 4:
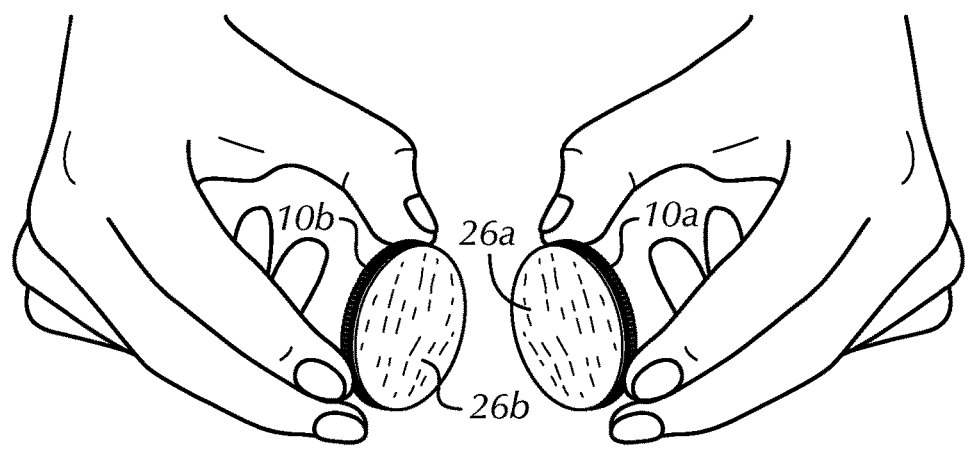
FIG. 4 is a perspective view of the sandwich shown in FIG. 1 after been peeled apart to expose a filling.
Figure 11:
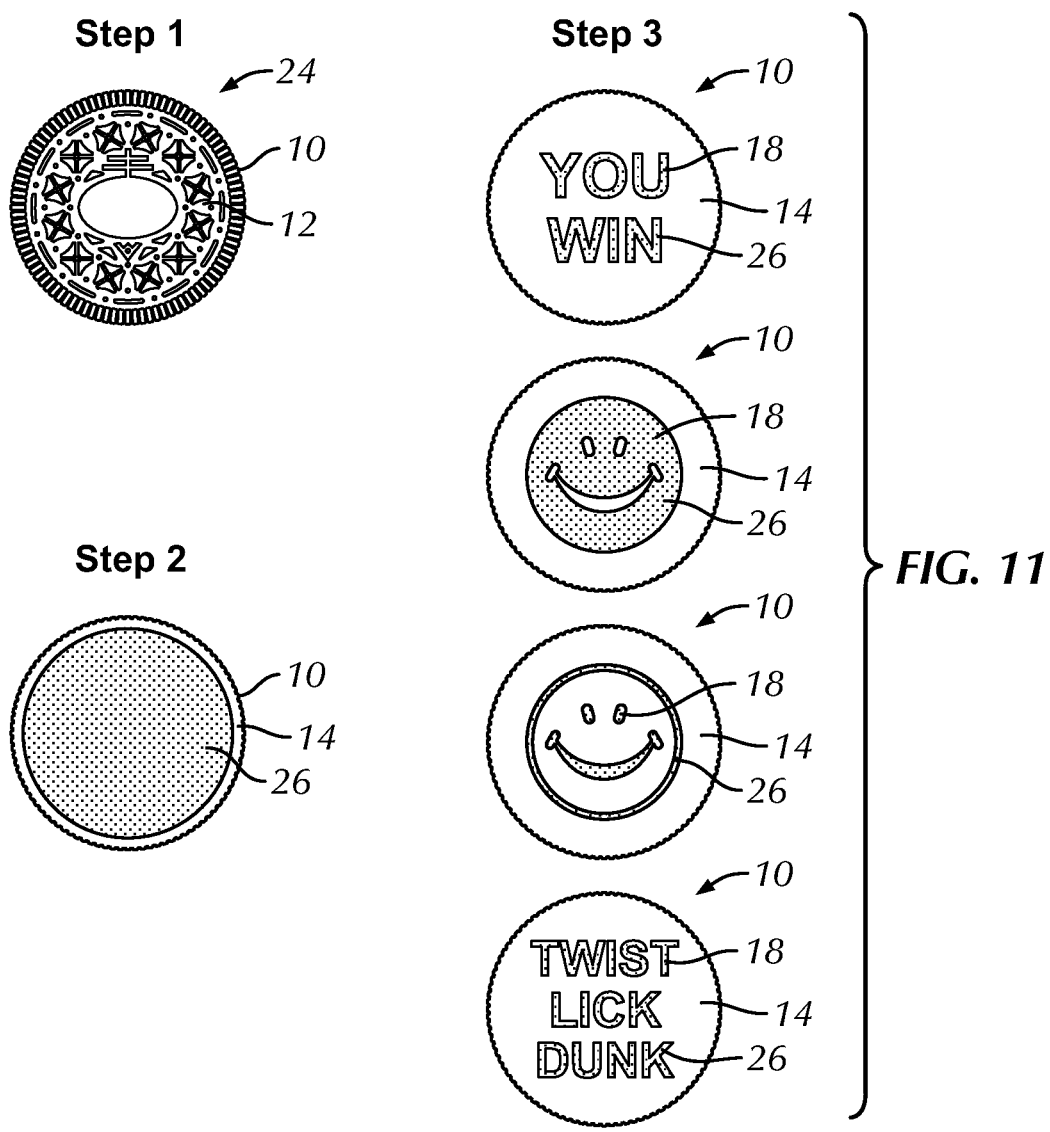
FIG. 11 illustrates the various stages of the cookie sandwich shown in FIG. 1 and various bottom views of the biscuits.

Referring to FIG. 4, in one embodiment, after separating first biscuit 10a from second biscuit 10b, a first portion 26a of filling 26 remains on first biscuit 10a and a second portion 26b of filling 26 remains on second biscuit 10b (see also step 2 in FIG. 11). In one embodiment, consumer must lick or otherwise scrape filling 26 off of biscuit 10 to reveal second indicia 18. In one embodiment, filling 26 dissolves or melts to reveal second indicia 18. In other embodiments, all of filling 26 remains with one of first biscuit 10a or second biscuit 10b to reveal second indicia 18 without filling 26.

Figure 5:
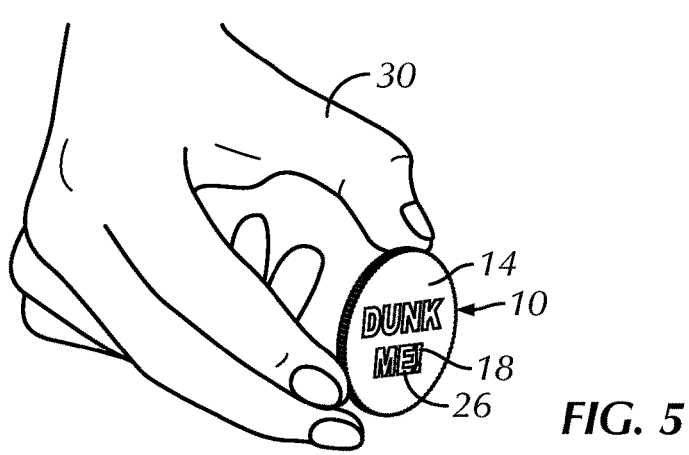
FIG. 5 is a perspective view of half of the sandwich shown in FIG. 4 after the bottom surface has been licked and/or scraped sufficiently to reveal a message on the bottom surface.

Referring to FIG. 5, in one embodiment, once a sufficient amount of filling 26 has been removed from biscuit 10, second indicia 18 is revealed to the consumer (see also step 3 in FIG. 11). In one embodiment, consumer licks and/or scrapes filling 26 until filling within imprint 22 is substantially flush with bottom surface 14. In one embodiment, filling 26 has a color that is different than a color of biscuit 10. In one embodiment, the consumer licks and/or scrapes the other biscuit 10 to review another second indicia 18. In one embodiment, the second indicia 18 on each half of sandwich 24 are related (e.g., to form a phrase or are related by a theme).

Referring to FIGS. 6-10 and 12, exemplary embodiments are shown relating to how biscuit 10 is made. In one embodiment, biscuit 10 is formed using a mold 32. In one embodiment, mold 32 is a rotary mold having a plurality of die cavities 32a. In one embodiment, the low moisture content of the dough requires that the dough be pressed and/or scraped into die cavities 32a.

Figure 12:
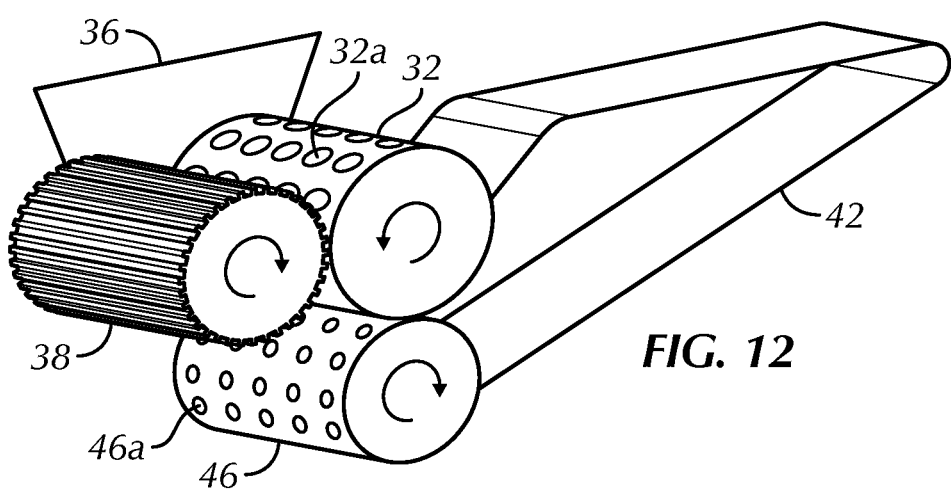
FIG. 12 is a perspective view of the molding and debossing rollers in accordance with an exemplary embodiment of the present invention.

Referring to FIG. 12, in one embodiment, biscuit 10 is debossed on both sides during molding. In one embodiment, a roller 46 with projections 46a debosses bottom side 14 of biscuits 10 after die cavities 32a have been filled with dough but prior to removing biscuits 10 from mold 32.

Figure 6:
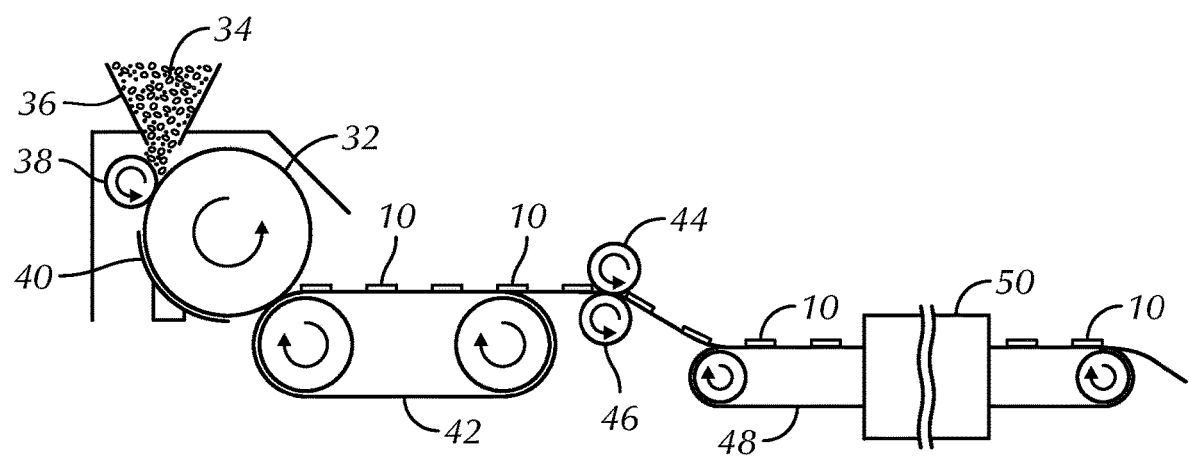
FIG. 6 is a side schematic of a system for making biscuits in accordance with an exemplary embodiment.
Figure 7:
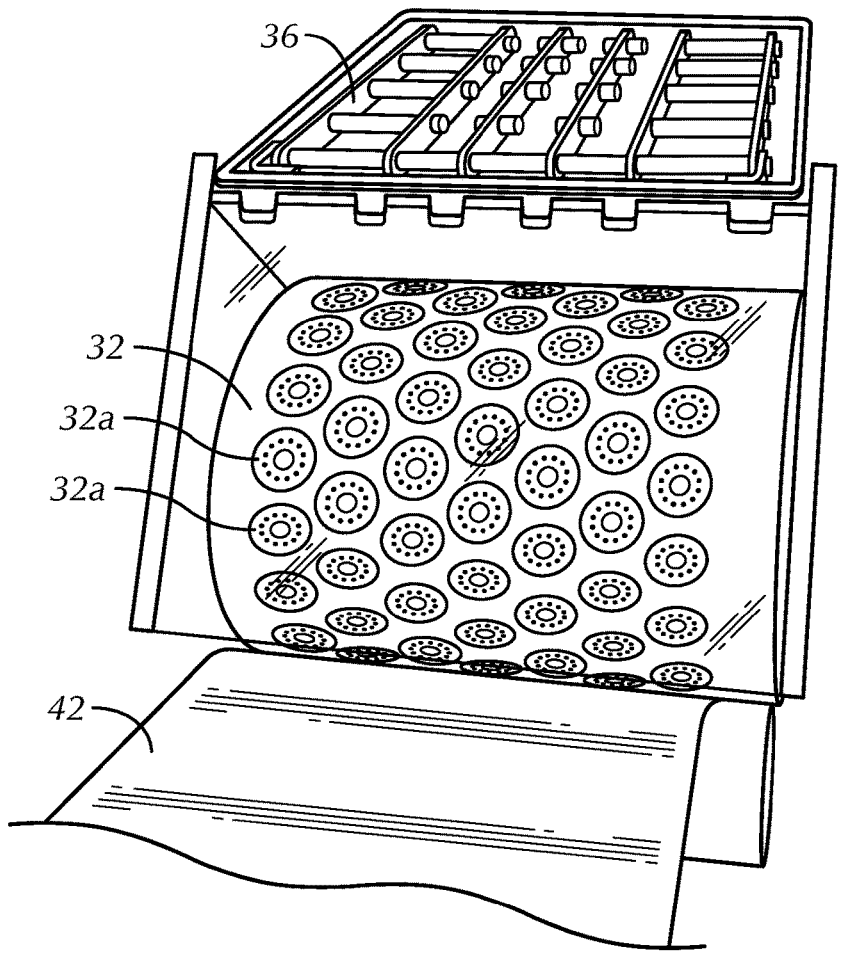
FIG. 7 is a perspective view of a rotary mold for use with the system shown in FIG. 6.

Referring to FIG. 6, in one embodiment, once die cavities 32a have been filled there is little space or time to imprint or deboss bottom surface 14 before removing biscuits 10 from mold 32. In one embodiment, in order to imprint or deboss bottom surface 14 after biscuit 10 is extracted from mold 32, a compliant surface is provided opposite a debossing surface, the compliant surface supporting top surface 12 without damaging projections 20. In one embodiment, the compliant surface at least partially extends over and between projections 20 to protect projections 20 while bottom surface 14 is debossed. In one embodiment, the compliant surface is pressed radially inwardly by projections 20 while bottom surface 14 is debossed. In one embodiment, the compliant surface maintains generally uniform pressure and support to top surface 12 while bottom surface 14 is debossed. In one embodiment, if a rigid surface supported top surface 12 while bottom surface 14 was debossed, the force exerted on top surface 12 would damage projections 20 and/or bend the remainder of biscuit 10. In one embodiment, the compliant surface is provided as a rotating roller opposed from a rotating debossing roller such that the compliant surface contacts one side of biscuit 10 and debossing roller contact the opposite side of biscuit 10. In other embodiments, the compliant surface is provided on a belt and the debossing surface is a roller or planar surface facing the belt. In other embodiment, the debossing surface is provided on the belt and the compliant surface is a roller or planar surface facing the belt.

Referring to FIG. 6, in one embodiment, biscuit 10 is formed using a mold 32. In one embodiment, mold 32 is a rotary mold having a plurality of die cavities 32a. In one embodiment, dough 34 is fed into a hopper 36. In one embodiment, dough 34 is pressed into die cavities 32a of mold 32 using a press roller 38 and/or a blade 40. In one embodiment, once the die cavities 32a are packed with dough 34, a belt 42 contacts bottom surface 14 of biscuit 10 and extracts biscuit 10 from die cavities 32a. In one embodiment, belt 42 transfers molded biscuits 10 to a first roller 44 and a second roller 46. In one embodiment, second roller 46 debosses or imprints bottom surface 14 with imprint 22. In one embodiment, biscuit 10 is then deposited on oven band 48. In one embodiment, biscuit 10 is then baked in oven 50.

In one embodiment, biscuit 10 is made from a dough 34 including sugar, fat and/or oil and water. In one embodiment, the dough includes approximately 11% to approximately 38% sugar, approximately 5% to approximately 23% fat and/or oil and approximately 4% to approximately 12% water by weight. In one embodiment, the dough includes less than approximately 15% water. In one embodiment, the dough includes less than approximately 14% water. In one embodiment, the dough includes less than approximately 13% water. In one embodiment, the dough includes less than approximately 12% water. In one embodiment, the dough includes less than approximately 11% water. In one embodiment, the dough includes less than approximately 10% water. In one embodiment, the dough includes less than approximately 9% water. In one embodiment, the dough includes less than approximately 8% water. In one embodiment, the dough includes less than approximately 7% water. In one embodiment, the dough includes less than approximately 6% water. In one embodiment, the dough includes less than approximately 5% water. In one embodiment, the dough includes less than approximately 4% water. In one embodiment, the dough includes less than approximately 3% water.

In one embodiment, the spreading of biscuit 10 during baking is minimized. In one embodiment, the shape of biscuit post-baking is substantially similar to the shape of the dough pre-baking. For example, biscuit 10 may retain, substantially retain, or appear to retain any edges (e.g., a projection 20 or imprint 22) formed during molding of the dough. In one embodiment, a surface area of bottom surface 14 before baking is limited to an increase of approximately 0.1% compared to a surface area of bottom surface 14 after baking. In one embodiment, a surface area of bottom surface 14 before baking is limited to an increase of approximately 0.5% compared to a surface area of bottom surface 14 after baking. In one embodiment, a surface area of bottom surface 14 before baking is limited to an increase of approximately 1% compared to a surface area of bottom surface 14 after baking.

Figure 8A:
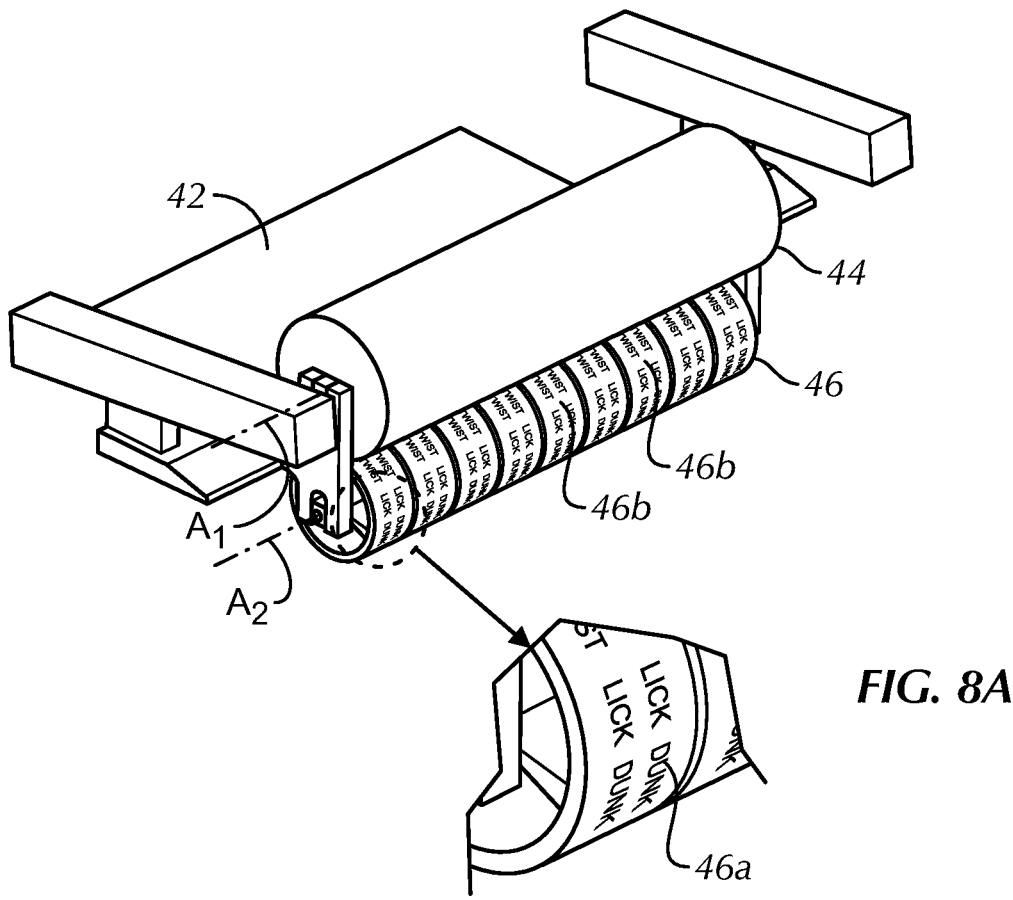
FIG. 8A is a perspective view, including a partial enlarged view, of debossing rollers in accordance with an exemplary embodiment of the present invention.
Figure 8B:
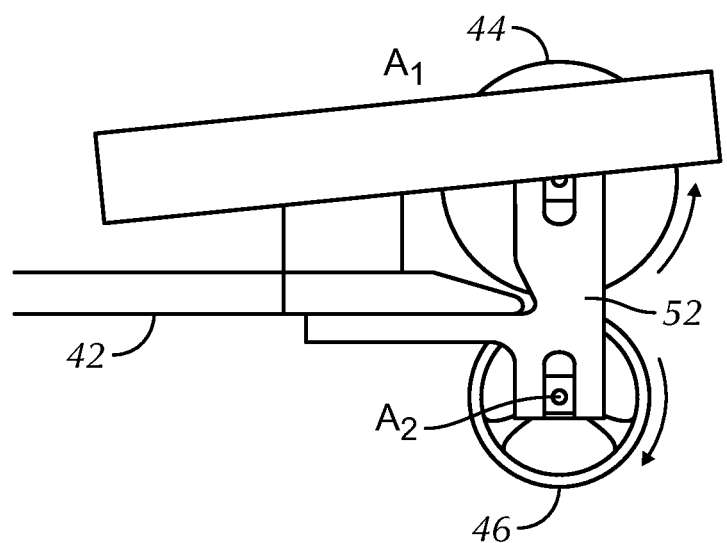
FIG. 8B is a side view of the debossing rollers shown in FIG. 8A.
Figure 9:
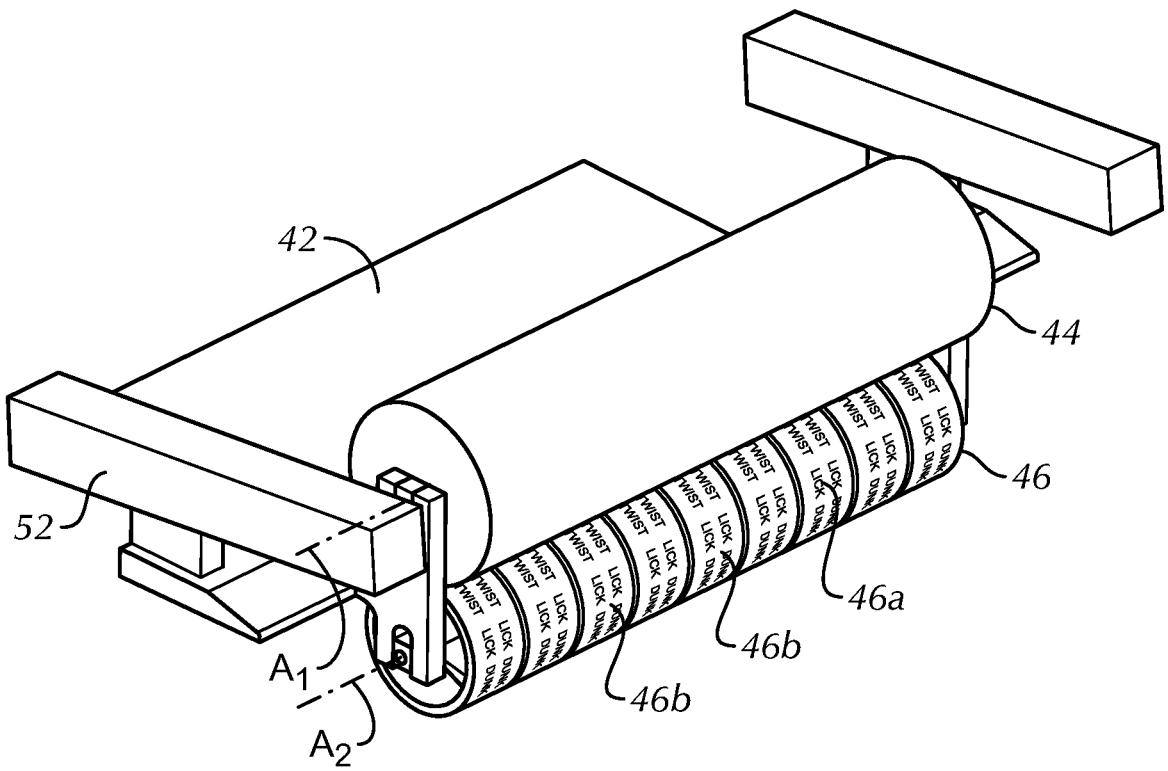
FIG. 9 is a perspective view of the debossing rollers shown in FIGS. 8A and 8B.

Referring to FIGS. 8 and 9, in one embodiment, first roller 44 rotates about axis $A_1$. In one embodiment, second roller 46 rotates about axis $A_2$. In one embodiment, axis $A_1$ and axis $A_2$ are parallel. In one embodiment, axis $A_1$ and axis $A_2$ lie on a generally vertical imaginary plane. In one embodiment, axis $A_1$ and axis $A_2$ lie on an imaginary plane that is at an oblique angle relative to belt 42. In one embodiment, first roller 44 is motor driven. In one embodiment, second roller 46 is motor driven. In one embodiment, a belt 54 or a series of gears couples first roller 44 to second roller 46 such that rollers 44, 46 only require a single motor. In one embodiment, first roller 44 rotates at the same speed as second roller 46. In one embodiment, rollers 44, 46 rotate at the same speed as belt 42. In one embodiment, first roller 44 is above second roller 46. In other embodiments, the positioning of rollers 44, 46 reversed.

In one embodiment, first roller 44 is coupled to second roller 46 using a frame 52. In one embodiment, first roller 44 is moveably mounted to frame 52 such that axis $A_1$ of the first roller moves toward and away from axis $A_2$ of second roller 46. In one embodiment, the distance between axis $A_1$ and axis $A_2$ is adjustable. In one embodiment, at least one of first roller 44 and second roller 46 is spring biased relative to the other. In one embodiment, frame 52 is secured relative to belt 42. In one embodiment, frame 52 is removeably secured to belt 42 such that rollers 44, 46 may be selectively utilized to deboss biscuits 10. In one embodiment, the configuration and position of rollers 44, 46 allows for simple integration into an existing product line.

In one embodiment, first roller 44 is comprised of a compliant material. In one embodiment, first roller 44 has a shore A durometer of less than approximately 10. In one embodiment, first roller 44 has a shore A durometer of less than approximately 15. In one embodiment, first roller 44 has a shore A durometer of less than approximately 20. In one embodiment, first roller 44 has a shore A durometer of less than approximately 25. In one embodiment, first roller 44 has a shore A durometer of less than approximately 30. In one embodiment, first roller 44 has a shore A durometer of less than approximately 35. In one embodiment, first roller 44 has a shore A durometer of less than approximately 40. In one embodiment, first roller 44 has a shore A durometer of less than approximately 45. In one embodiment, first roller 44 has a shore A durometer of less than approximately 50. In one embodiment, first roller 44 has a shore A durometer of less than approximately 55. In one embodiment, first roller 44 is comprised of an elastomeric material. In one embodiment, first roller 44 is comprised of rubber. In one embodiment, first roller 44 is comprised of recovery foam. In one embodiment, first roller 44 is comprised of open cell foam.

In one embodiment, second roller 46 includes one or more debossing surfaces 46a. In one embodiment, debossing surfaces 46a includes one or more projections for imprinting into bottom surface 14 of biscuit 10. In one embodiment, debossing surfaces 46a are spaced apart from one another a distance equal to the distance die cavities 32a are spaced apart from one another. In one embodiment, the position of first and second rollers 44, 46 relative to belt 42 is manually adjusted. In one embodiment, the position of debossing surfaces 46a is determined using a sensor that detects the position of biscuits approaching on belt 42. In one embodiment, the position of debossing surfaces 46a relative to incoming biscuits 10 is adjusted automatically.

In one embodiment, second roller 46 is comprised of a rigid material. In one embodiment, second roller 46 is comprised of metal. In one embodiment, second roller 46 is comprised of aluminum. In one embodiment, second roller 46 is comprised of bronze. In one embodiment, second roller 46 is comprised of a polymeric material. In one embodiment, second roller 46 is comprised of polyoxymethylene. In one embodiment, second roller 46 is coated with a surface release coating that reduces the amount second roller 46 adheres to biscuit 10. In one embodiment, second roller 46 is coated with Tufram®. In one embodiment, second roller is coated with Tufram® HO having a surface hardness of approximately Rc 40 to approximately Rc 50.

Figure 10:
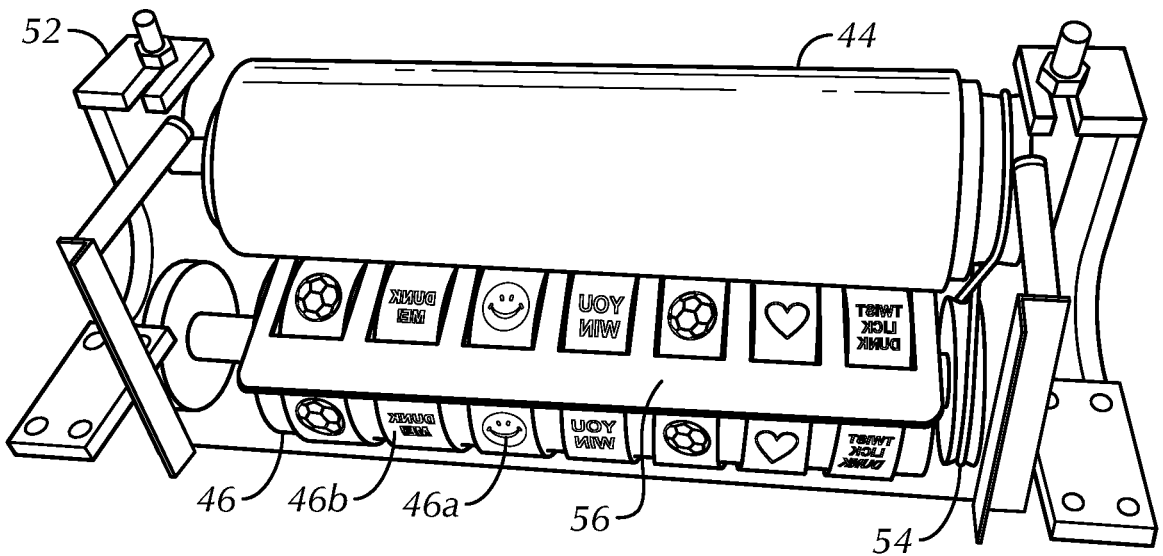
FIG. 10 is a perspective view of debossing rollers in accordance with another exemplary embodiment of the present invention.

In on embodiment, second roller 46 is comprised of a single cylinder. In one embodiment, second roller 46 is comprised of a plurality of cylindrical sections 46b. In one embodiment, sections 46b of second roller 46 are rotatably adjustable relative to each other. In one embodiment, sections 46b of second roller 46 are detachable from the remainder of second roller 46 in order to allow for additional imprint designs to be interchanged. In one embodiment, a space or a cylindrical section without debossing is provided between sections 46b having debossing to provide a row or more of biscuits without debossing on the bottom surface. Referring to FIG. 10, in one embodiment, a guide 56 is attached to frame 52 and positioned between first roller 44 and second roller 46. In one embodiment, guide 56 assists in transferring biscuits 10 from belt 42 to oven band 48. In one embodiment, guide 56 extends between each section 46b such that each biscuit 10 is supported by guide 56 the entire time the biscuit 10 is moved between first roller 44 and second roller 46.

Exemplary products 1-4, that include one or more biscuits 10, have the characteristics as set forth in Tables 1-3 below.

TABLE 1

| % Major Ingredients of dough by weight | Product 1 | Product 2 | Product 3 | Product 4 | % Range |
|---|---|---|---|---|---|
| Sugar | 22.7 | 37.1 | 11.8 | 16.2 | 11.8-37.1 |
| Fat/oil | 10.2 | 22.6 | 5.9 | 13.2 | 5.9-22.6 |
| Water | 8.3 | 11.6 | 5.1 | 4.3 | 4.3-11.6 |

TABLE 2

|  | Product 1 | Product 2 | Product 3 | Product 4 | % Range |
|---|---|---|---|---|---|
| Thickness of each biscuit post-bake | 0.20" Target 0.19"-0.21" Range | 0.20" Target 0.19"-0.21" Range | 0.20" Target 0.19"-0.21" Range | 0.26" Target 0.25"-0.28" Range | 0.19"-0.28" |

TABLE 3

|  | Product 1 | Product 2 | Product 3 | Product 4 | % Range |
|---|---|---|---|---|---|
| % Moisture of each biscuit post-bake | 2.80% Target 2.40%-3.20% Range | 2.80% Target 2.10%-3.50% Range | 2.95% Target 2.10%-3.80% Range | 2.0% Target 1.50%-2.50% Range | 1.50%-3.80% |

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

We claim:

1. A baked dough-based biscuit comprising:
   a generally planar top surface having first indicia situated thereon, the first indicia situated on the generally planar top surface including a plurality of projections extending from the generally planar top surface;
   a generally planar bottom surface having second indicia comprising a recess into the generally planar bottom surface terminating at a recess depth, the recess being bounded by at least one sidewall, and
   a base region between the generally planar top surface and the recess depth;
   an edible filling contained within the recess such that the second indicia lies on a plane generally co-planar with the generally planar bottom surface;

wherein the baked dough-based biscuit has a moisture content of less than about 5%, and wherein the base region has a first density and the at least one sidewall has a second density that is less than the first density.

2. The baked dough-based biscuit of claim 1, wherein the sidewall is at an oblique angle with respect to the generally planar bottom surface.

3. The baked dough-based biscuit of claim 2, wherein the oblique angle is less than approximately 65 degrees.

4. The baked dough-based biscuit of claim 1, wherein the recess depth from the portion of the generally planar bottom surface is approximately 60% of a thickness of the baked dough-based biscuit.

5. The baked dough-based biscuit of claim 1, wherein the recess depth from the portion of the generally planar bottom surface is approximately 40% of a thickness of the baked dough-based biscuit.

6. The baked dough-based biscuit of claim 1, wherein the recess depth from the portion of the generally planar bottom surface is approximately 20% to approximately 60% of a thickness of the baked dough-based biscuit.

7. The baked dough-based biscuit of claim 1, wherein the second indicia includes one or more words.

8. The baked dough-based biscuit of claim 1, wherein the second indicia includes one or more images.

9. The baked dough-based biscuit of claim 8, wherein the second indicia is a negative of the one or more images such that the one or more images projects from the dough-based biscuit.

10. The baked dough-based biscuit of claim 1, wherein at least some of the plurality of projections have a thickness in a direction generally parallel to the generally planar top surface of less than approximately 0.04 inches.

11. The baked dough-based biscuit of claim 1, wherein the plurality of projections extend approximately 0.115 inches from the generally planar top surface.

12. The baked dough-based biscuit of claim 1, wherein the baked dough-based biscuit is approximately 0.2 inches thick.

13. The baked dough-based biscuit of claim 1, wherein the baked dough-based biscuit is approximately 0.1 inches to approximately 0.3 inches thick.

14. A sandwich foodstuff comprising:
a first baked dough-based biscuit comprising:
a generally planar first top surface having a plurality of first projections extending from the generally planar first top surface, and
a generally planar first bottom surface having first indicia comprising a first recess into the generally planar first bottom surface terminating at a first recess depth, the first recess being bounded by at least one first sidewall, and
a first base region between the generally planar first top surface and the first recess depth;
wherein the first base region has a first density and the at least one first sidewall has a second density that is less than the first density;
a second baked dough-based biscuit comprising:
a generally planar second top surface having a plurality of second projections extending from the generally planar second top surface, and
a generally planar second bottom surface; and
a filling sandwiched between the generally planar first bottom surface and the generally planar second bottom surface, wherein the first contains said filling such that the first indicia lies on a first plane generally co-planar with the generally planar first bottom surface.

15. The sandwich foodstuff of claim 14, wherein the generally planar second bottom surface has second indicia comprising a second recess into the generally planar second bottom surface terminating at a second recess depth, the second recess being bounded by at least one second sidewall.

16. A baked dough-based biscuit comprising:
a generally planar top surface having first indicia situated thereon, the first indicia situated on the generally planar top surface including a plurality of projections extending from the generally planar top surface;
a generally planar bottom surface having second indicia comprising a recess into the generally planar bottom surface terminating at a recess depth, the recess being bounded by at least one side wall; and
a base region between the generally planar top surface and the recess depth,
wherein the baked dough-based biscuit has a moisture content of less than about 5%, and
wherein the base region has a first density and the at least one sidewall has a second density that is less than the first density.

* * * * *